(12) United States Patent
Parshall et al.

(10) Patent No.: US 10,936,662 B1
(45) Date of Patent: Mar. 2, 2021

(54) DETECTION OF AUTOMATED AGENTS THROUGH INTERACTION ELEMENT PRESENTATION

(71) Applicant: Amazon Technologies, Inc., Seattle, WA (US)

(72) Inventors: Daniel R. Parshall, Seattle, WA (US); Rui Chen, Seattle, WA (US); Serguei B. Stepaniants, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 473 days.

(21) Appl. No.: 15/585,019

(22) Filed: May 2, 2017

(51) Int. Cl.
*G06F 16/9032* (2019.01)
*G06F 3/0482* (2013.01)
*G06F 16/9535* (2019.01)

(52) U.S. Cl.
CPC ...... *G06F 16/90328* (2019.01); *G06F 3/0482* (2013.01); *G06F 16/9535* (2019.01)

(58) Field of Classification Search
None
See application file for complete search history.

(56) References Cited

U.S. PATENT DOCUMENTS

| | | | |
|---|---|---|---|
| 6,564,213 B1 | 5/2003 | Ortega et al. | |
| 10,152,458 B1 | 12/2018 | Stepaniants et al. | |
| 10,305,911 B1 * | 5/2019 | Eyre | H04L 63/102 |
| 2015/0170665 A1 | 6/2015 | Gundeti et al. | |
| 2016/0042748 A1 | 2/2016 | Jain et al. | |
| 2016/0274764 A1 * | 9/2016 | Moreau | G06F 3/04842 |
| 2016/0277429 A1 * | 9/2016 | Demirjian | G06F 21/36 |
| 2016/0337253 A1 * | 11/2016 | Tang | H04L 47/28 |
| 2017/0091809 A1 * | 3/2017 | Liu | G06Q 30/0246 |
| 2017/0269825 A1 * | 9/2017 | Wu | G06F 3/04847 |

OTHER PUBLICATIONS

Stepaniants, S.B., et al., "Systems for Determining Long-Term Effects in Statistical Hypothesis Testing," U.S. Appl. No. 14/661,981, filed Mar. 18, 2015.

* cited by examiner

*Primary Examiner* — Thu N Nguyen
(74) *Attorney, Agent, or Firm* — Davis Wright Tremaine LLP

(57) ABSTRACT

A computer-facilitated service selects, in response to a request to access user interface, an interaction element that can be presented via the user interface. The computer-facilitated service records information involving user interactions with the interaction element presented via the user interface. A model is applied to the recorded information to determine a classification of the user from a set of classifications that comprises human users and automated agents. The computer-facilitated service records an association between the user and the classification.

20 Claims, 11 Drawing Sheets

US 10,936,662 B1

DETECTION OF AUTOMATED AGENTS THROUGH INTERACTION ELEMENT PRESENTATION

BACKGROUND

Computer-facilitated service providers and other providers often enable users, through various user clients, to access a variety of computer-facilitated services to obtain information, complete transactions and otherwise interact with these computer-facilitated services. These computer-facilitated services, while primarily utilized by legitimate customers and other users of these services, may also receive various requests from automated agents or other automated processes. Some users may utilize these automated agents or automated processes to gather sensitive information, sabotage online polling, and obtain information about other users. However, classifying users as either legitimate customers or automated agents may be difficult and can lead to false identification of legitimate customers as automated agents, thereby impacting the ability of these legitimate customers from accessing these computer-facilitated services.

BRIEF DESCRIPTION OF THE DRAWINGS

Various techniques will be described with reference to the drawings, in which.

DETAILED DESCRIPTION

Figure 1:
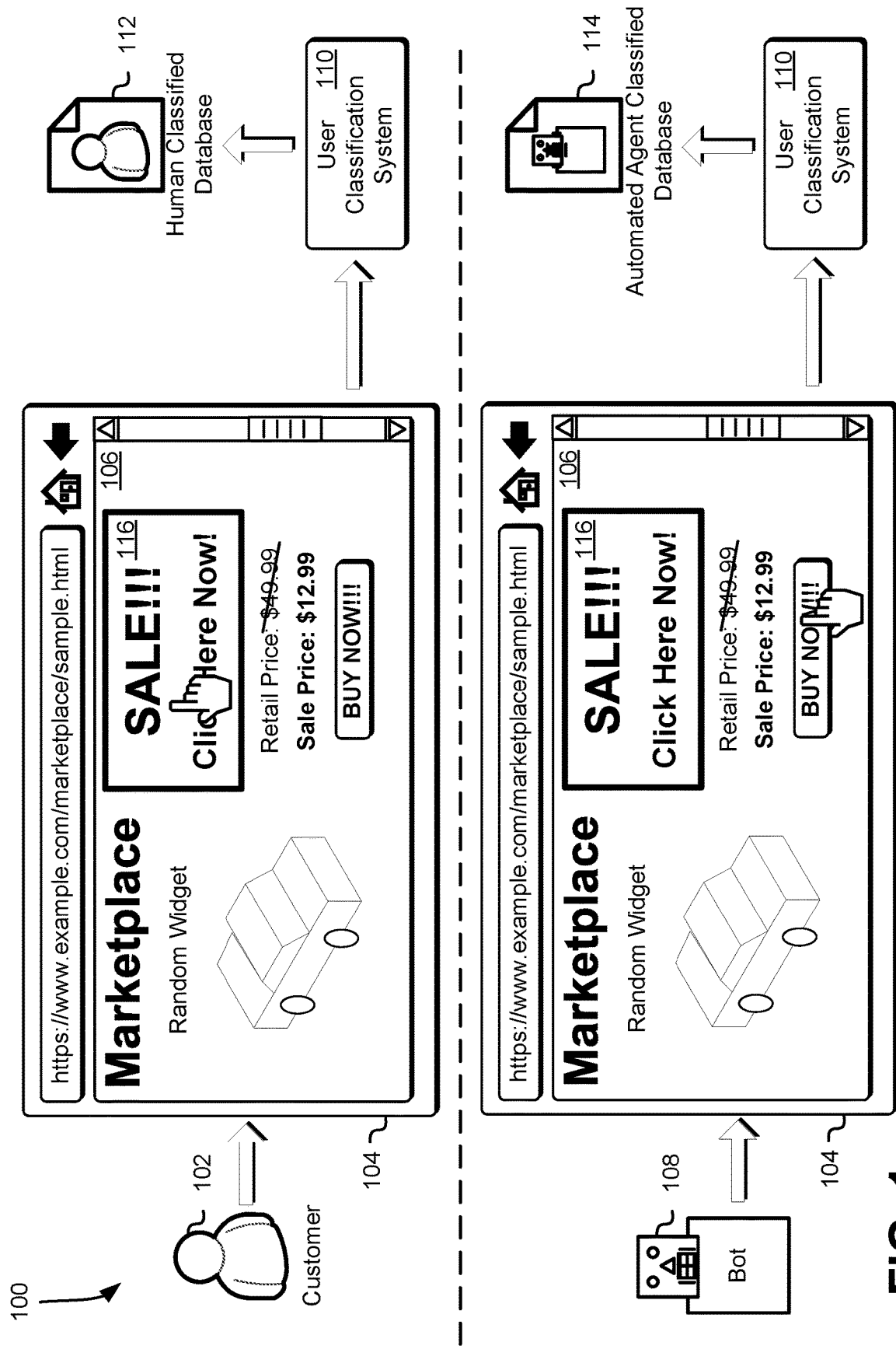
FIG. 1 shows an illustrative example of an environment in which various embodiments can be implemented.

This patent disclosure relates to the use of interaction elements presented via a webpage of a website to classify clients as either legitimate customers of a computer-facilitated service or automated agents. In an example, a computer-facilitated service receives a request from a client (e.g., user) to access a particular website provided by the computer-facilitated service. In response to the request, the computer-facilitated service may select interaction elements that are to be presented via the webpage that can be used to classify the client as either being a legitimate customer of the computer-facilitated service or an automated agent. In some instances, the computer-facilitated service may use identifying information of the client specified in the request to determine whether the client was previously suspected of being an automated agent. If so, the computer-facilitated service may identify additional interaction elements that can be presented via the webpage to generate additional data for determining whether the client is a legitimate customer or an automated agent. The interaction elements may include user interface components presented within the webpage that may be monitored by the computer-facilitated service to classify client activity. For instance, the computer-facilitated service may record any cursor movements, button presses, keyboard key presses, periods of inactivity viewing the webpage, and any modification of the programming code of the interaction elements presented via the webpage. The computer-facilitated service may record client interactions with the interstitial user interface component, as well as other interaction elements presented via the webpage in an activity log specific to the client.

In an example, the computer-facilitated service obtains an activity log that specifies the client interactions with the interaction elements of the webpage, which can be used to determine whether the client's behavior is indicative of a legitimate customer of the service of an automated agent. The computer-facilitated service may use the activity log for the client as input to a set of heuristics that are used to classify client behavior as either being indicative of a human response or of an automated agent response. For instance, each interaction element may be weighed differently within the vector based on the historical accuracy of the interaction element for detecting automated agent activity. Alternatively, the vector may be used to determine whether a majority of interaction elements presented to the client demonstrate that the client is likely an automated agent.

If the computer-facilitated service determines, based on the output of the heuristics used to analyze the vector, that the client is likely an automated agent, the computer-facilitated service may perform various actions to make it more difficult for the automated agent to interact with the website. For instance, the computer-facilitated service may deny a later request from the client to access the website. Alternatively, the computer-facilitated service may present the client with additional challenges that may need to be addressed in order to interact with the website. If the computer-facilitated service is unable to determine, based on the output of the heuristics, whether the client is an automated agent or a human actor, the computer-facilitated service may present additional or alternative interaction elements in response to later access to the website by the client. The recorded interactions with these additional or alternative interactions may be used to provide a more definitive response as to whether the client is an automated agent. As the computer-facilitated service processes the vectors created using the activity logs through the heuristics, the computer-facilitated service may update the heuristics to improve their accuracy in identifying behavior indicative of an automated agent.

In this manner, the computer-facilitated service can use client interactions with presented interaction elements via a website to classify the client as being either a legitimate customer of the service or an automated agent. Additionally, the techniques described and suggested herein facilitate additional technical advantages. For example, because the computer-facilitated service uses the output of the heuristics to determine whether a particular client is a legitimate customer or an automated agent, the computer-facilitated service may use this information to determine the accuracy of the results and refine the heuristics to be more accurate in discovering behavior indicative of an automated agent. Further, the output may be used by the computer-facilitated service to create new interaction elements that can be used to further refine the heuristics and, thereby, their accuracy in detecting behavior indicative of an automated agent. In some instances the computer-facilitated service may increase the efficiency of automated agent detection by pre-classifying users based on experiments performed by the computer-facilitated service using sample inputs to the heuristics. The computer-facilitated service may further improve the efficiency in detecting automated agents by allowing for different and more efficient responses to be given to automated agents and by allowing resources to be more effectively allocated by being able to distinguish humans from automated agents.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a customer 102 may utilize a user client 104 to request access to a particular site 106. The site 106 may be maintained by a computer-facilitated service, which may enable the customer 102 to access certain data, purchase items from an online marketplace, access an e-mail account, and the like. When the customer 102 utilizes the user client 104 to request access to the particular site 106, the computer-facilitated service may receive the request and obtain information necessary to determine whether the customer 102 may be granted access to the site 106. For instance, in an embodiment, the computer-facilitated service determines, from the request, identifying information for the customer 102. The identifying information may include a set of user credentials for the customer 102, IP address for the customer 102, one or more cookies, and the like. This identifying information may be used to determine the customer's 102 past activities as related to the particular site 106 or other sites and resources provided by the computer-facilitated service.

Based at least in part on the information provided by the customer 102 through the request and the customer's 102 past activity, the computer-facilitated service may identify one or more interaction elements 116 that may be presented via the user client 104 in addition to the other elements presented by default on the site 106. For instance, if the computer-facilitated service determines, based at least in part on a user's past activity that the user is likely a legitimate customer 102 of the computer-facilitated service, the computer-facilitated service may select fewer interaction elements 116 that may be presented along with the site 106 through the user client 104. Alternatively, if the computer-facilitated service determines, based at least in part on the customer's 102 past activity that the customer is likely an automated agent 108, the computer-facilitated service may select additional interaction elements 116 that may be presented to obtain further interaction information usable to more accurately determine whether the customer is an automated agent 108. Alternatively, the computer-facilitated service may select interaction elements 116 that may be more difficult for an automated agent 108 to circumvent.

The one or more interaction elements 116 may include, for example and as illustrated in the environment 100, an interactive illustration that a user may utilize to access another webpage of the site 106 via the user client 104. For instance, an interaction element 116 may present the user of the user client 104 an option to access another webpage to view items that are on sale, other offers provided by the computer-facilitated service, other features of the site 106, and the like. Other interaction elements 116 may include interactive text, other interactive illustrations, hyperlinks, input fields, user interface buttons, static images, dynamic and animated images (e.g., Graphics Interchange Format (GIF) images, etc.), JavaScript objects, flash objects, Hyper-Text Markup Language (HTML) objects, HTML forms, interstitial user interface components, and the like. In some embodiments, the interaction element 116 is presented in a manner that prevents blocking of other elements presented on the webpage of the site 106. For instance, the interaction element 116, while presented on the webpage, may still enable the user to interact with the webpage without having to dismiss the interaction element 116. Thus, even while the interaction element 116 is present, the user may not be impeded in accessing other elements associated with the webpage. For example, the interaction element 116 may be presented as one of several elements of the webpage without visually impeding access to other elements and without requiring interaction to access functionality not directly related to the interaction element.

Some interaction elements 116, such as input fields or forms that may accept user input, may be generated such that these interaction elements 116 may be successfully completed by an automated agent 108 or other automated agent. For instance, an automated agent 108 may determine a proper response to information requested in the one or more interaction elements 116 by parsing text, without performing image, audio, or video processing, and applying a set of rules to the parsed text. The automated agent 108 or automated process may obtain the requested information from a database or other information repository accessible by the automated agent 108 or automated process. For such interaction elements 116, the computer-facilitated service may record the amount of time elapsed between presentation of the interaction elements 116 and the input of the requested information. The amount of time elapsed may be used to classify the user as either a legitimate customer 102 or an automated agent 108. It should be noted that automated agents may be colloquially called "bots" or "robots" and are distinguishable from client applications configured to auto-fill entry fields with customer information by way of being able to navigate through a site or other collection of user interface pages in an automated fashion.

In some embodiments, the one or more interaction elements 116 are monitored by the computer-facilitated service to record user interaction with the one or more interaction elements 116. For instance, the computer-facilitated service may track the customer's 102 button presses, key presses, cursor movement on the user client 104, and other inputs associated with the interaction elements 116 presented via the user client 104. These inputs may be recorded within an activity log, which may include the various inputs by customers, automated agents and other automated processes. Additionally, the computer-facilitated service may monitor user interaction with other elements of the site 106 to determine whether the user has been influenced by the presence of the one or more interaction elements 116. For example, if the computer-facilitated service generates one or more interaction elements 116 that causes other content of the site 106 to be obscured, necessitating a user to use a scroll bar of the user client 104 to de-obscure the other content, the computer-facilitated service may monitor the site 106 to determine the length of time between presentation of the one or more interaction elements 116 and the user's use of the scroll bar to access the other content of the site 106. This information may also be recorded in the activity log and associated with the one or more interaction elements 116 presented via the user client 104.

The computer-facilitated service may include a user classification system 110, which may comprise one or more hardware resources (e.g., hardware servers, data storage devices, network devices, processors and other equipment) that may utilize the activity log for a user to determine whether the user can be classified as either a legitimate customer 102 of the computer-facilitated service or an automated agent 108. For instance, the user classification system 110 may access an activity log repository maintained by the computer-facilitated service to obtain an activity log corresponding to a user that has access to the site 106. As will be described in greater detail below, an activity log for a particular user may specify identifiers corresponding to the interaction elements 116 presented to the user on the site 106, as well as details regarding the interactions made by the user in response to presentation of the one or more interaction elements 116. These details may specify any cursor movements, button presses, keyboard key presses, movement of the interaction elements 116 through use of a scroll bar of the application used to present the site 106, time duration of inactivity at a particular portion of the site 106, and the like.

In an embodiment, the user classification system 110 organizes the data specified in an activity log into one or more vectors, which may be analyzed, through one or more functions (classifiers) to determine whether the user is likely a legitimate customer 102 of the computer-facilitated service or an automated agent 108. The results of these analyses, utilizing the one or more functions, may be used to classify the user and identify additional or alternative interaction elements 116 that may be presented to the user. For instance, if the user is classified as an automated agent 108, the user classification system 110 may add an identifier of the user within an automated agent classified database 114, which the computer-facilitated service may use to identify automated agents 108 and the interaction elements 116 to be presented to the automated agents 108. Similarly, if the user is classified as a legitimate customer 102 (e.g., a human), the user classification system 110 may add an identifier of the user within a human classified database 112, which the computer-facilitated service may use to identify legitimate customers 102 of the computer-facilitated service.

The user classification system 110 may be initialized and/or updated using machine learning techniques, such as supervised learning techniques. A machine learning algorithm may, at any time, utilize one or more sample vectors to perform one or more simulations to determine whether the functions utilized by the user classification system 110 are producing correct and accurate results and/or to refine the one or more functions utilized by the user classification system 110 to produce correct and accurate results. For instance, during initialization of the machine learning algorithm, the computer-facilitated service may provide the machine learning algorithm with one or more sample vectors and analytical results (e.g., desired outcomes) that should be obtained based at least in part on these one or more sample vectors. The machine learning algorithm, based at least in part on this exercise, may adjust the functions utilized by the user classification system 110 to analyze the vectors corresponding to activity of the user of the user client 104 in interacting with the one or more interaction elements 116 presented to the user.

The machine learning algorithm may receive input from one or more analysts employed by the computer-facilitated service to analyze the results from the one or more analyses performed by the user classification system 110 through use of the one or more functions described above. For instance, an analyst may review the activity logs and the one or more vectors generated by the user classification system 110 to determine whether the user should be classified as a legitimate customer 102 or an automated agent 108. The analyst may provide his/her input for use in refining a function used to classify vector input as corresponding to a legitimate customer 102 or an automated agent 108. The vector of measurements corresponding to the review performed by the analyst and the desired outcome corresponding to the analyst's input may be used by the machine learning algorithm to update the function used to classify vector inputs. Such may be performed by multiple analysts and/or using multiple vector inputs to provide the machine learning algorithm a sufficient number of sample vector inputs and desired outputs. The machine learning algorithm may adjust the one or more functions used by the user classification system 110 to increase the likelihood that the desired result is obtained in future analyses.

The function used to classify measurement vectors may vary in accordance with various embodiments. For example, in some embodiments, support vector machine techniques are used to classify regions in Euclidean space as indicative of a legitimate customer 102 or an automated agent 108 so that measurements are classified in accordance with the region in which the measurement vectors fall. In yet another embodiment, the machine learning algorithm can utilize decision tree learning to determine a decision (classification, regression) tree used to classify vector input as being indicative of a legitimate customer 102 or an automated agent 108. As a fictitious illustrative example, if a minimum requirement established by the computer-facilitated service for classifying a user as a legitimate customer 102 is that a user cannot bypass an interaction element 116 that is used to request customer information before providing other information on the site 106 and that the user is to interact with the interaction element 116 for a period of time greater than a threshold period of time, the machine learning may result in a decision tree that, at least in part, bifurcates based on vector components indicating whether the user was presented with the interaction element 116, whether the user interacted with the interaction element 116, and whether the user interacted with the interaction element 116 for a period of time greater than the threshold amount of time. If the input indicates presentation of the interaction element 116, that the user has bypassed the interaction element 116, and that the user has not interacted with the interaction element 116 for a period of time greater than the threshold, the one or more functions (decision trees) would, in this example, provide a result that the user is likely an automated agent 108. Thus, the machine learning algorithm may adjust the one or more functions if these one or more functions do not indicate that the user is likely an automated agent 108.

If the user classification system 110 determines that the user is likely a legitimate customer 102 (e.g., a human), the user classification system 110 may update a human classified database 112 to generate an entry for the user. The entry may specify the IP address of the user, as well as other information that may be used to identify future user requests to access and interact with the site 106. Thus, if the user accesses the site 106 at a later time, the computer-facilitated service may query the human classified database 112 to determine if the user has been classified as being a legitimate customer 102. If so, the computer-facilitated service may allow the user to access the site 106 without presenting any interaction elements 116 or with fewer interaction elements 116 to potentially distract the user.

However, if the user classification system 110 determines that the user is likely an automated agent 108, the user classification system 110 may update an automated agent classified database 114 to generate an entry for the user. Similar to the human classified database 112, the entry within the automated agent classified database 114 may specify the IP address of the user and other information usable to identify future user requests to access and interact with the site 106. The computer-facilitated service, if the automated agent 108 accesses the site 106, may identify the automated agent 108 via the automated agent classified database 114 and perform one or more operations to mitigate the automated agent's impact on the site 106. For instance, the computer-facilitated service may present the automated agent 108 with a blocking interstitial user interface component, which may prevent any access to the site 106 until one or more actions are undertaken to remove the restrictions in place to prevent automated agent 108 access to the site 106. Alternatively, the computer-facilitated service may present the automated agent 108 with additional interaction elements 116 that may be used to obtain further characteristics of the automated agent 108, which may be used to identify other automated agents 108. In some embodiments, if the user classification system 110 is unable to classify the user as either a legitimate customer 102 or an automated agent 108, the user classification system 110 may cause the computer-facilitated service to provide additional interaction elements 116 on the site 106 to obtain additional measurements for the user. Thus, as the user interacts with the additional interaction elements 116, the user classification system 110 may obtain more information regarding the user that can be used to classify the user as either a legitimate customer 102 or an automated agent 108 with a greater degree of accuracy.

It should be noted that other actions may be performed by the computer-facilitated service if the user classification system 110 classifies the user as an automated agent 108. For instance, the computer-facilitated service may provide information to the automated agent 108 that is more easily consumed by the automated agent 108 or redirect the automated agent 108 to an interface that is more appropriate for the automated agent 108. For example, the computer-facilitated service may serve webpages to an automated agent 108 without images or with low-resolution images to increase the efficiency of the computer-facilitated service. Further, the computer-facilitated service may avoid serving some interaction elements that are not applicable to automated agents. Similarly, the computer-facilitated service may flag activity logs corresponding to automated agent activity in order to perform more accurate analytics by removing such activity logs.

Figure 2:
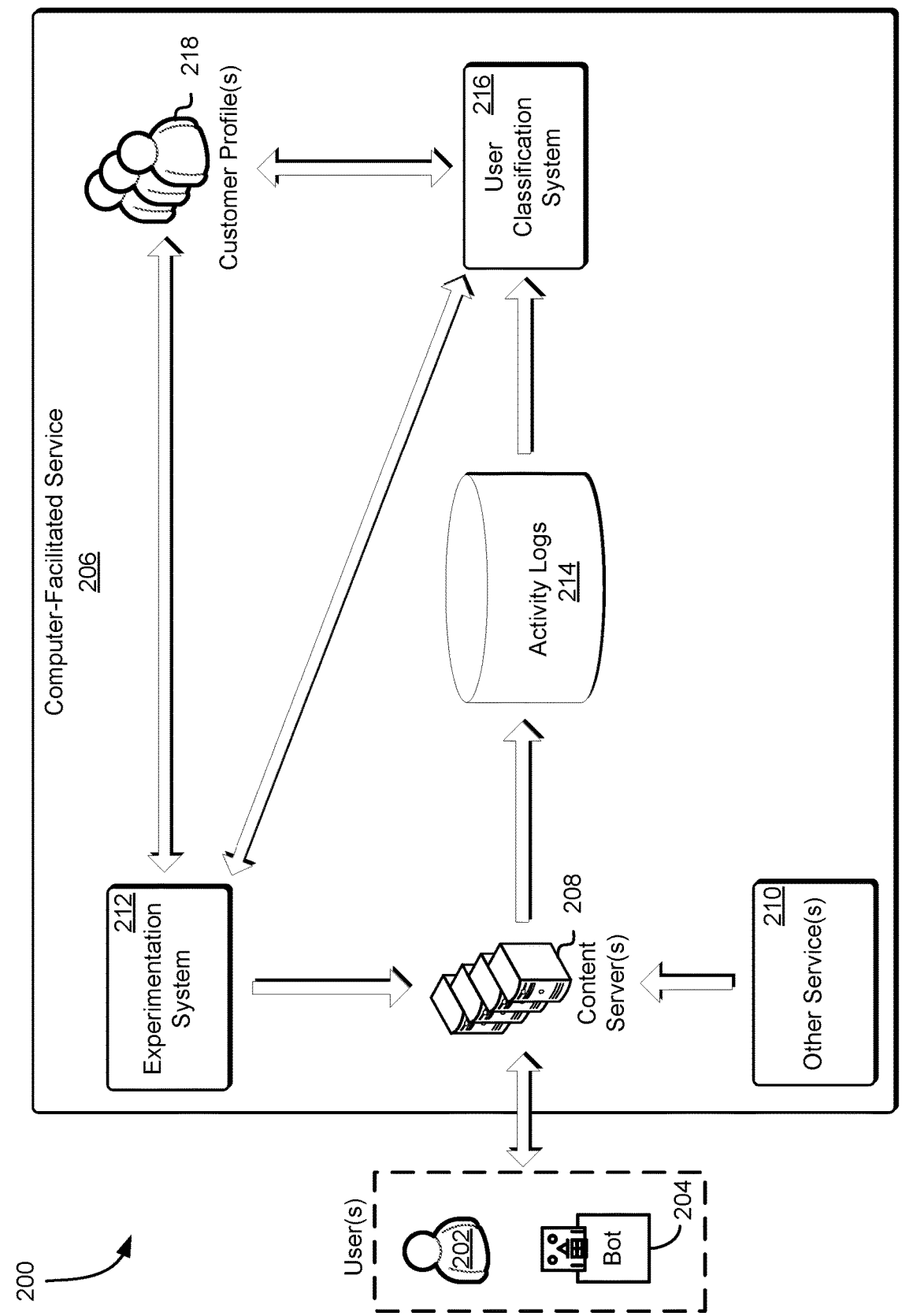
FIG. 2 shows an illustrative example of an environment in which a computer-facilitated service, through an experimentation system, generates one or more interaction elements that can be used to classify users accessing the computer-facilitated service in accordance with at least one embodiment.

As noted above, a computer-facilitated service may generate one or more interaction elements that may be presented to a user of a site provided by the computer-facilitated service. The computer-facilitated service may monitor user interactions with the interaction elements and record these interactions in an activity log for the user. Through the user classification system, the computer-facilitated service may use the activity log for the user as input to one or more functions for classifying users as either legitimate customers or automated agents. Based at least in part on the output of these one or more functions, the user classification system may update a profile of the user to indicate whether the user is likely a legitimate customer or an automated agent. This may be used to determine whether any remedial steps are to be taken if the user is identified as an automated agent or if any additional interaction elements are to be presented to obtain further characteristics of the user. Accordingly, FIG. 2 shows an illustrative example of an environment 200 in which a computer-facilitated service 206, through an experimentation system 212, generates one or more interaction elements that can be used to classify users accessing the computer-facilitated service 206 in accordance with at least one embodiment.

In the environment 200, a user transmits a request to one or more content servers 208 of a computer-facilitated service 206 to access a site provided by the computer-facilitated service 206. The user may be a legitimate customer 202 of the computer-facilitated service 206, which may utilize the site or other resources provided by the computer-facilitated service 206 for its business or personal needs. Alternatively, the user may be an automated agent 204 or other automated process that may access the computer-facilitated service 206 to gather sensitive information, sabotage online polling, obtain information about other users, and the like. In response to a request to access a site provided by the computer-facilitated service 206, the one or more content servers 208 may obtain information necessary to determine whether the customer 202 may be granted access to the computer-facilitated service 206. For instance, one or more content servers 208 may determine, from the request, identifying information for the user. The identifying information may include a set of user credentials for the user, IP address for the user, one or more cookies, and the like.

Using the information garnered from the request, the one or more content servers 208 may transmit a request to an experimentation system 212 of the computer-facilitated service 206 to determine previous activity for the user, as well as data usable to generate one or more interaction elements within the site to be provided to the user. The experimentation system 212 may comprise one or more computer systems of the computer-facilitated service 206 that provide data usable to generate interaction elements within a site provided by the computer-facilitated service 206. For instance, the experimentation system 212 may provide HTML code, JavaScript code, or other code to the content servers 208 to cause the content servers 208 to use the code to generate the one or more interaction elements. In some embodiments, the experimentation system 212 uses information provided by the content servers 208 and obtained from the request made by the user to query a customer profile datastore 218 and identify a customer profile that corresponds to the user. The customer profile may specify past user activity in interacting with the site and other resources provided by the computer-facilitated service 206. Additionally, the customer profile may specify a classification of the user. For example, the customer profile may specify whether the user has been previously classified as a legitimate customer 202 of the computer-facilitated service 206 or as an automated agent 208. In some instances, the customer profile datastore 218 may indicate that there is no customer profile available for the user.

The experimentation system 212 may evaluate the customer profile and the information provided by the one or more content servers 208 to determine which interaction elements are to be presented via the site generated by the content servers 208. For instance, if the customer profile for the user indicates that the user is suspected of being an automated agent 204, the experimentation system 212 may select one or more interaction elements that, historically, have been effective in eliciting behavior from a user that can be used to determine whether the user is an automated agent 204. The experimentation system 212 may also identify one or more interaction elements that may be presented via the site in addition to a default set of interaction elements presented to all users of the computer-facilitated service 206. Alternatively, if the customer profile for the user indicates that the user has been identified as a legitimate customer 202 of the computer-facilitated service 206, the experimentation system 212 may use the default set of interaction elements or no interaction elements, as it may not be required to perform additional experiments to determine whether the user is an automated agent 204.

The one or more content servers 208 may also transmit a request to one or more other services 210 to obtain the content that is to be presented via the site and the one or more selected interaction elements. For instance, the other services 210 may include an online retail service that may provide information associated with an item available for purchase via the online retail service. This information may include images of the item, customer reviews of the item, item-specific information (e.g., retail prices, sale prices, purchase limitations, quantity available, etc.), shipping information, and the like. The other services 210 may also include an advertisement service, which may provide data corresponding to advertisements to be presented on the site. In some embodiments, the content servers 208 utilize information provided by the experimentation system 212 to identify data to be obtained from the one or more other services 210. For instance, if the experimentation system 212 provides code for an interaction element that is usable to advertise a particular sale, the content servers 208 may access an advertisement service to obtain data associated with the sale that can be used in the interaction element. Alternatively, if an interaction element to be included on the site is to indicate a sale price for an item offered via the site, the content servers 208 may access the online retail service to obtain the sale price for the item that may be presented as an interaction element on the site.

Using the code provided by the experimentation system 212 and the data provided by the one or more other services 210, the content servers 208 may generate the site. The content servers 208 may transmit data to a client device of the user to cause the client device to render the site using an application installed on the client device, such as a web browser. In an embodiment, the content servers 208 may monitor the user's interactions with the site, including any interactions with the selected interaction elements and interactions with the site directly influenced by the selected interaction elements. For instance, the content servers 208 may track any cursor movements, button presses, keyboard key presses, movement of the interaction elements 116 through use of a scroll bar of the application used to present the site, time duration of inactivity at a particular portion of the site, and the like.

The content servers 208 may record any interactions (or lack of interactions) with the site and with any interaction elements presented on the site in an activity log specific to the user. If the user terminates its session on the site, the content servers 208 may transmit the activity log for the user to an activity log repository 214. The activity log repository 214 may include one or more storage devices, servers, or other computing devices that can be used to digitally store activity logs for users of the computer-facilitated service 206. Each activity log may be identifiable through a unique identifier that is specific to the particular user that accessed the site or other resource provided by the content servers 208. For instance, if the user provides a username to access the site, the content servers 208 may generate the activity log for the user and use the username as part of an identifier for the activity log. Alternatively, the content servers 208 may utilize the IP address of the user to distinguish the activity log from other activity logs in the activity log repository 214. In some examples, the activity log may also specify a timestamp corresponding to the time at which the activity log was transmitted by the content servers 208 to the activity log repository 214 or to the time at which the user accessed the computer-facilitated service 206.

An activity log may include an entry corresponding to each interaction element presented to the user via the site. An entry within the activity log may specify a unique identifier for the corresponding interaction element presented on the site, any interactions with the interaction element, timestamps indicating when the interactions occurred, time periods indicating activity or inactivity associated with the interaction element, and the like. Additionally, the activity log may specify any attempts to bypass an interaction element, such as an interstitial user interface component or other component that may be used to obfuscate information presented on the site.

In an embodiment, the computer-facilitated service 206 includes a user classification system 216 that utilizes the activity logs from the activity log repository 214 to determine whether users of the computer-facilitated service 206 can be classified as either legitimate customers of the computer-facilitated service 206 or automated agents. The user classification system 216 may organize the data specified in an activity log into one or more vectors, which may be analyzed, through one or more functions to determine whether the corresponding user is a legitimate customer 202 of the computer-facilitated service 206 or an automated agent 204. The results of these analyses, utilizing the one or more functions, may be used to classify the user and identify additional or alternative interaction elements that may be presented to the user. The function used to classify measurement vectors generated using an activity log may vary in accordance with various embodiments. For example, in some embodiments, support vector machine techniques are used to classify regions in Euclidean space as indicative of a legitimate customer 202 or an automated agent 204 so that measurements are classified in accordance with the region in which the measurement vectors fall. In yet another embodiment, the machine learning algorithm can utilize decision tree learning to determine a decision tree used to classify vector input as being indicative of a legitimate customer 202 or an automated agent 204. As described above, the functions utilized by the user classification system 216 may be initialized and/or updated using machine learning techniques, such as supervised learning techniques. A machine learning algorithm may, at any time, utilize one or more sample vectors to perform one or more simulations to determine whether the functions utilized by the user classification system 216 are producing correct and accurate results and/or to refine the one or more functions utilized by the user classification system 216 to produce correct and accurate results.

In some embodiments, the user classification system 216 obtains, from the customer profile datastore 218, a profile of the user for whom the activity log is being evaluated. If the customer profile for the user indicates that the user is either a known customer 202 or automated agent 204, the user classification system 216 may utilize this information as a source of truth to further enhance the accuracy of the functions using the machine learning algorithm. For instance, if the user classification system 216 determines, using the one or more functions and information from the activity log, that the user is likely a legitimate customer 202 but the user's profile indicates that the user is a known automated agent 204, the user classification system 216 may adjust the machine learning algorithms to improve the accuracy of the functions to detect the automated agent 204 using the information garnered from the activity log.

Based at least in part on the output of the one or more functions, the user classification system 216 may access the customer profile datastore 218 to update a profile of the user to indicate whether the user is either a legitimate customer 202 or an automated agent 204. Additionally, the user classification system 216 may identify one or more interaction elements that may be presented to the user in response to a new request from the user to access the site. For instance, the user classification system 216 may access the experimentation system 212 to identify interaction elements that have not been previously presented to the user that may be used to obtain more information about the user. As an illustrative example, if the user classification system 216 determines, based at least in part on the output of the one or more functions, that the user is likely an automated agent 204, the user classification system 216 may access the experimentation system 212 to identify additional implementation elements that may be presented to the user to garner more information about the user's behavior and responses to these interaction elements. This may enable the computer-facilitated service 206 to more readily detect automated agents and perform any actions to mitigate the impact of automated agent interaction with the service. Additionally, the additional implementation elements may be used to impede the performance of an automated agent 204, such that the automated agent 204 may require additional processing time and resources to access the computer-facilitated service 206 or any information provided by the service. Alternatively, if the user classification system 216 determines that the user is likely a legitimate customer 202, the user classification system 216 may select less intrusive interaction elements for presentation or may prevent presentation of any interaction elements except ones used typically by the site. The user classification system 216 may update the customer profile for the user to indicate the user's status as either a legitimate customer 202 or an automated agent 204 and to indicate the one or more interaction elements that may be presented to the user.

If the user accesses the computer-facilitated service 206 to access the site, the content servers 208 may transmit a request to the experimentation system 212 to obtain code for generating the interaction elements that are to be presented to the user. Thus, the experimentation system 212 may access the customer profile datastore 218 to identify a profile for the user and identify the one or more interaction elements specified by the user classification system 216 as being displayable to the user. The experimentation system 212 may generate the code for the identified interaction elements and provide this code to the content servers 208. The content servers 208 may use the code to generate the interaction elements and present these interaction elements to the user.

Figure 3:
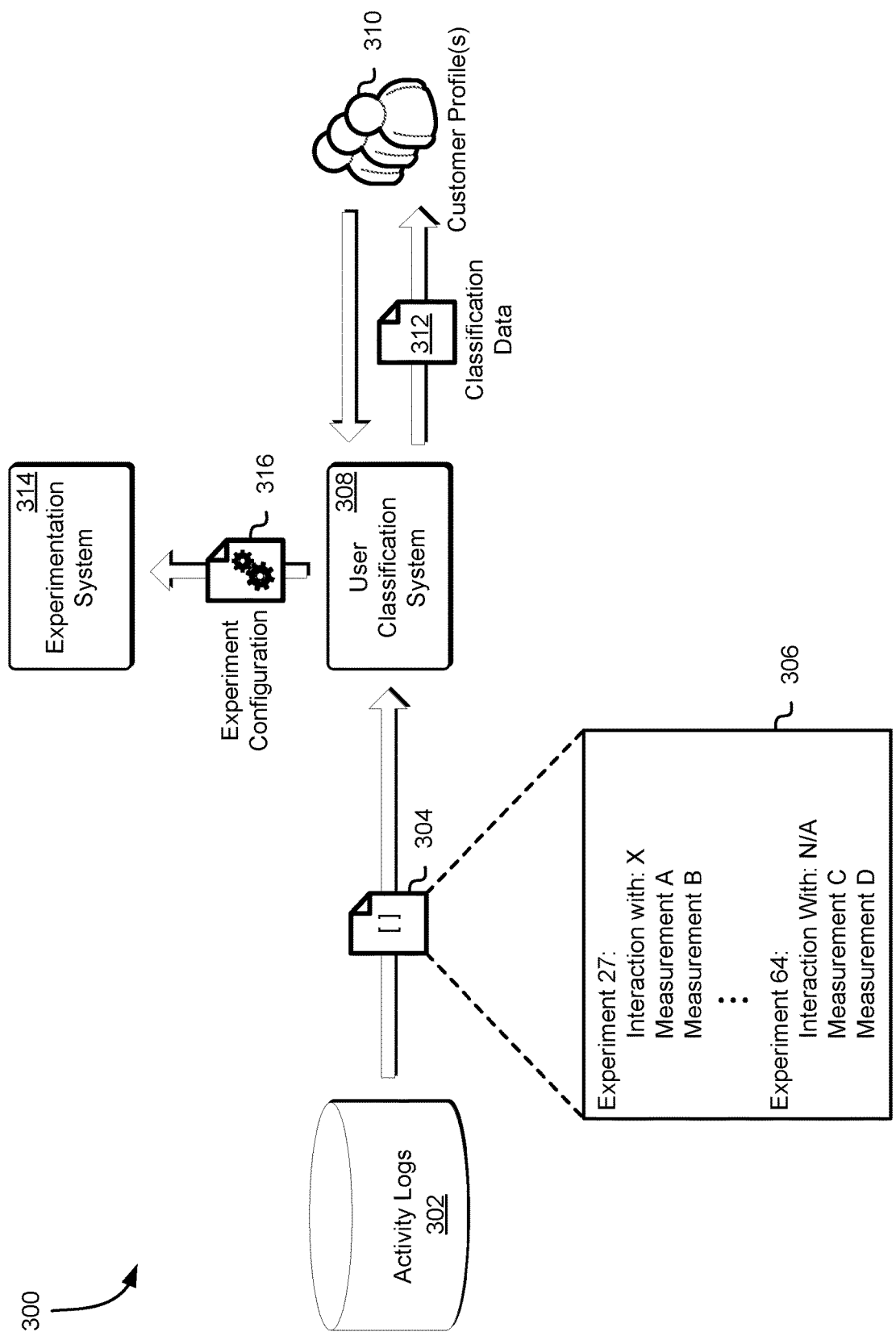
FIG. 3 shows an illustrative example of an environment in which a user classification system utilizes an activity log for a user to classify the user as either a legitimate customer or an automated agent and to determine additional interaction elements to be presented to refine classifications of users in accordance with at least one embodiment.

As noted above, the user classification system may obtain an activity log for a user of the computer-facilitated service, which may organize the data specified in the activity log into one or more vectors and may analyze these vectors through one or more functions to determine whether the corresponding user is a legitimate customer of the computer-facilitated service or an automated agent. Based at least in part on the output of these functions, the user classification system 308 may interact with the experimentation system to configure additional or alternative interaction elements that may be presented to the user. Further, the user classification system may update a profile of the user to indicate whether the user has been classified as a legitimate customer or as an automated agent. Accordingly, FIG. 3 shows an illustrative example of an environment 300 in which a user classification system 308 utilizes an activity log 304 for a user to classify the user as either a legitimate customer or an automated agent and to determine additional interaction elements to be presented to refine classifications of users in accordance with at least one embodiment.

In the environment 300, the user classification system 308 obtains an activity log 304 corresponding to a user from an activity log repository 302. The activity log 304 may include one or more entries 306, each corresponding to interaction elements presented to the user. For example, as illustrated in FIG. 3, at least two different interaction elements were presented to the user (e.g., Experiment 27 and Experiment 64). Each entry within the activity log 304 may specify any cursor movements, button presses, keyboard key presses, movement of the corresponding interaction element through use of a scroll bar of the application used to present a site, time duration of inactivity at a particular portion of the site, and the like. Additionally, or alternatively, each entry may specify information regarding the influence of the interaction element in the user's behavior in interacting with the site. For instance, if the interaction element includes an interstitial user component element that obfuscates other elements of the site, the entry within the activity log 304 may specify whether the user attempted to bypass or modify the code of the interstitial user component element to access the obfuscated elements of the site.

The user classification system 308 may organize the entries 306 specified in an activity log 304 into one or more vectors, which may be analyzed, through one or more functions (classifiers) to determine whether the user is likely a legitimate customer of the computer-facilitated service or an automated agent. The results of these analyses, utilizing the one or more functions, may be used to classify the user and identify additional or alternative interaction elements that may be presented to the user. The user classification system 308 may generate classification data 312 based at least in part on the output of the one or more functions. This classification data 312 may specify the determined classification of the user based at least in part on the analysis of the activity log 304. Additionally, in some embodiments, the classification data 312 specifies identifiers for one or more interaction elements that are to be presented to the user if the user accesses the computer-facilitated service at a later time. For instance, the user classification system 308 may interact with an experimentation system 314 to identify potential interaction elements that may be used to garner additional behavior characteristics of the user, which may be used to further confirm the classification assigned to the user and to refine the one or more functions used by the user classification system 308 to classify users of the computer-facilitated service. The user classification system 308 may transmit the classification data 312 to a customer profile datastore 310 where it may be stored in association with a customer profile for the user.

As noted above, the user classification system 308 may be initialized and/or updated using machine learning techniques. For instance, a machine learning algorithm may utilize one or more sample vectors to perform one or more simulations to determine whether the functions utilized by the user classification system 308 are producing correct and accurate results and/or to refine the one or more functions utilized by the user classification system 308 to produce correct and accurate results. The machine learning algorithm, based at least in part on this exercise, may adjust the functions utilized by the user classification system 308 to analyze the vectors corresponding to activity of a user in interacting with the one or more interaction elements presented to the user. In some instances, the user classification system 308 may access the customer profile datastore to determine whether a user has been definitively classified as an automated agent or a legitimate customer by the computer-facilitated service through alternative means (e.g., indication from another service or entity, etc.). This information may be used to further refine the functions in the event that the functions provide an erroneous or inconclusive classification of the user based at least in part on the entries 306 specified in the activity log 304.

Based at least in part on the classification assigned to the user by the user classification system 308, the user classification system 308 may generate experiment configuration information 316 that may be used to configure one or more interaction elements that may be presented to the user. The experiment configuration information 316 may specify one or more identifiers for interaction elements that may be generated by the experimentation system 314 and provided to one or more content servers for presentation to the user. Additionally, the experiment configuration information 316 may specify code usable to generate new interaction elements or interaction elements that are customized for the particular user. For instance, the experimentation system 314 may access the customer profile datastore 310 to identify the profile of a user accessing a site provided by the computer-facilitated service. Using the profile, the experimentation service 314 may identify any interaction elements that are to be presented to the user. Further, based at least in part on the identified interaction elements, the experimentation system 314 may refer to the experiment configuration 316 provided by the user classification system 308 to obtain any code specific to the identified interaction elements that the experimentation system 314 may not have previously used.

Figure 4:
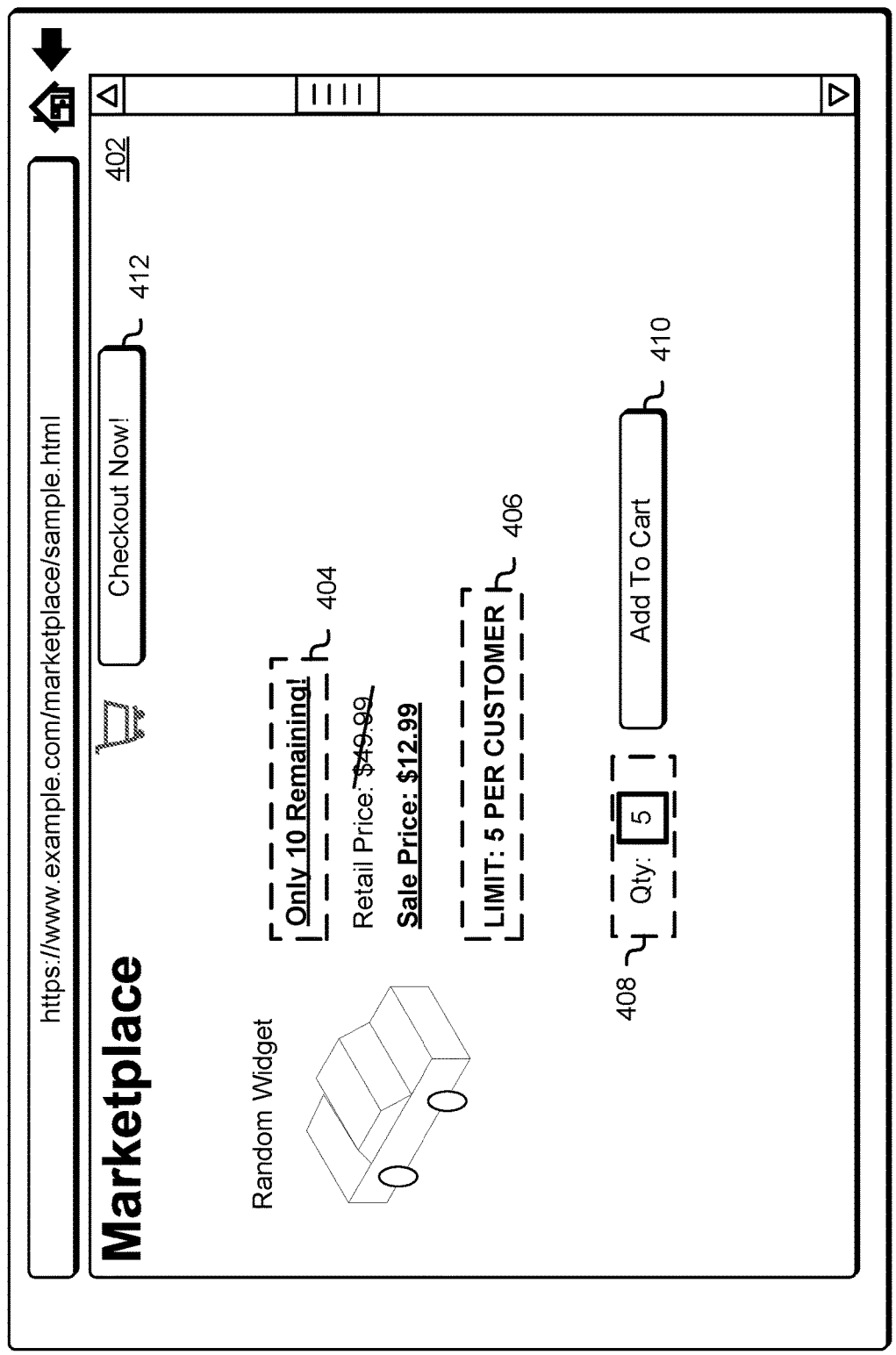
FIG. 4 shows an illustrative example of an environment in which interaction elements detailing limitations in the quantity of an item are utilized to classify users in accordance with at least one embodiment.

As noted above, a computer-facilitated service may present a user, via a user interface of a user client, with one or more interaction elements that may be monitored to classify the user as either a legitimate customer of the service or as an automated agent. Accordingly, FIG. 4 shows an illustrative example of an environment 400 in which interaction elements detailing limitations in the quantity of an item are utilized to classify users in accordance with at least one embodiment. In the environment 400, the computer-facilitated service generates, in response to a user request, a site 402 that may be presented via a user interface of a browser application installed on the user's client device. As described above, the computer-facilitated service may identify one or more interaction elements that may be presented to the user based at least in part on past user behavior and previous classifications made by the user classification system based on this past user behavior. The computer-facilitated service may integrate these interactions elements on to the site 402 such that the service may monitor user interactions with these interaction elements and generate an activity log specifying these interactions.

As an illustrative example, the computer-implemented service may present a quantity remaining interaction element 404 within the site 402. The quantity remaining interaction element 404 may be used to indicate the number of remaining units of an item presented via the site 402 which are available to the user. In some instances, a legitimate customer may be influenced by the quantity remaining interaction element 404 to request a greater quantity of the item presented via the site 402 in order to stockpile the item before it is no longer available. Further, the legitimate customer may submit a request to obtain the item in less time than average. Thus, if the quantity remaining interaction element 404 is presented, the computer-facilitated service may monitor the site 402 to identify the item quantity requested and the speed at which the user selected the add to cart button 410 and the checkout now button 412 to submit its request.

In addition to the quantity remaining interaction element 404, the computer-facilitated service may present a quantity limitation interaction element 406 within the site 402. The quantity limitation interaction element 406 may specify a limitation to the quantity of an item the user may request at any time. The quantity limitation interaction element 406 may influence legitimate customer behavior by causing the user to potentially request the maximum amount possible for the item presented on the site 402. Thus, if the user selects the add to cart button 410 to add a quantity of the item to the online shopping cart and selects the checkout now button 412 to submit its request, the computer-facilitated service may record the quantity requested in an activity log, which may be used as a potential indicator of legitimate customer or automated agent behavior.

The computer-facilitated service may further include a quantity input field interaction element 408 to the site, which a user may utilize to identify the quantity of the item that it would like to request. In some instances, an automated agent will request a single unit of an item regardless of the limitations imposed on requests or the quantity of the item made available through the site. Thus, if a user specifies that it would like to request more than one unit of the item, this may serve as an indication that the user is not an automated agent but rather a legitimate customer. In some instances, in conjunction with the other interaction elements 404, 406, the user may specify a prohibited quantity in the quantity input field interaction element 408, which may cause the computer-facilitated service to notify the user that it has inputted a prohibited quantity. The computer-facilitated service may record the quantity specified in the quantity input field interaction element 408 in the activity log. Further, if the quantity specified violates one of the prohibitions imposed by other interaction elements presented on the site 402, the violation may be indicated in the entry corresponding to the quantity input field interaction element 408.

Figure 5:
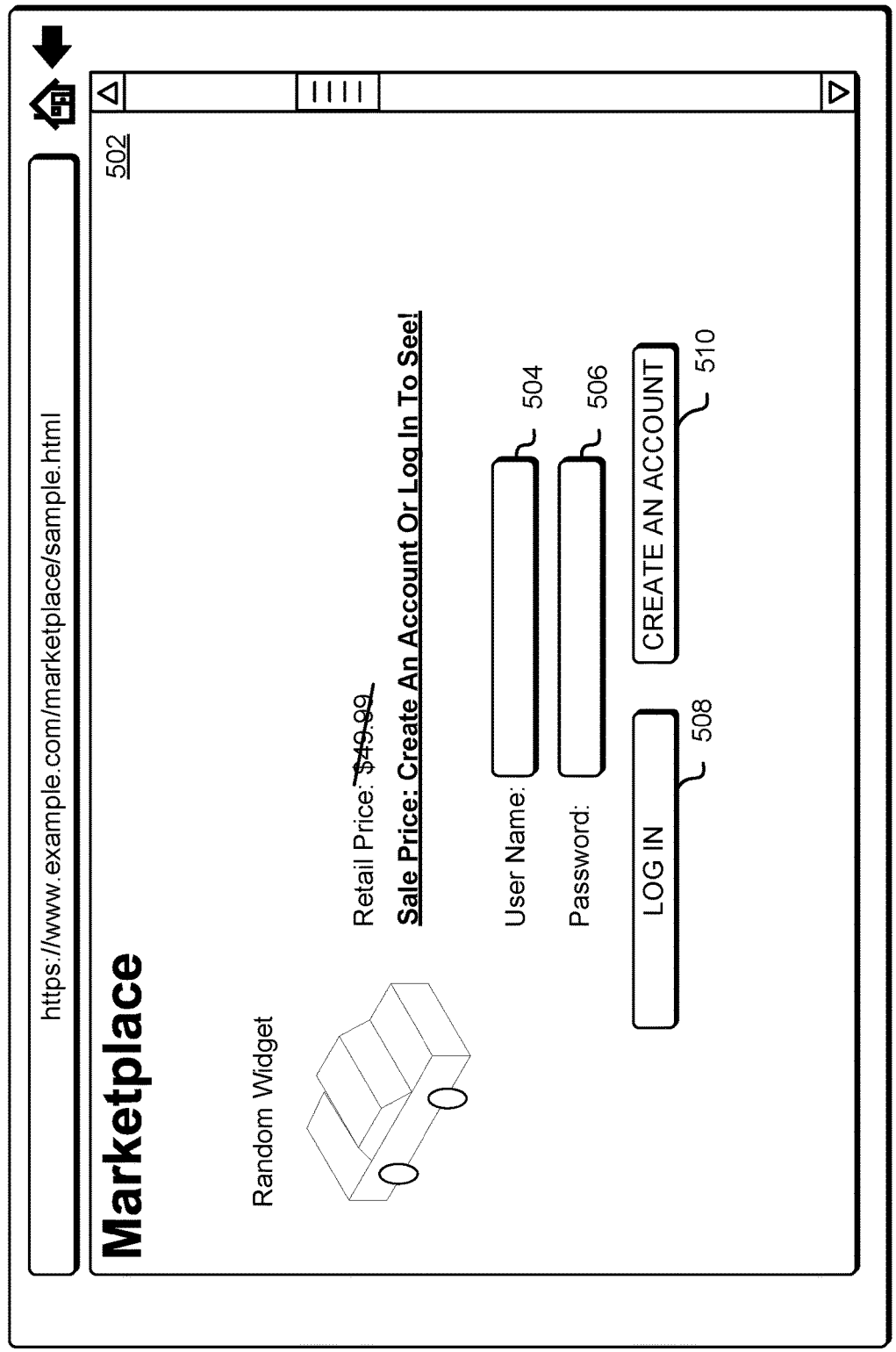
FIG. 5 shows an illustrative example of an environment in which interaction elements for accessing a user account to view details of an item are utilized to classify users in accordance with at least one embodiment.

FIG. 5 shows an illustrative example of an environment 500 in which interaction elements for accessing a user account to view details of an item are utilized to classify users in accordance with at least one embodiment. In this illustrative example, the customer may transmit a request to access a particular site 502, which, when presented in its entirety, may include a description of a particular item for sale, a retail price, a sale price and a button to enable the customer to purchase the item for sale. In the environment 500, the computer-facilitated service may obfuscate the price of the item offered by the service by requiring the user to create an account or to log in to an existing account. For instance, as illustrated in FIG. 5, the computer-facilitated service may modify the site 502 to provide a user name input field 504, a password input field 506, a log in button 508 and an account creation button 510. Further, the computer-facilitated service may prevent the customer from viewing the sale price for the particular item presented on the site 502, thereby requiring the user to provide its account credentials or create an account before the sale price is provided to it. Thus, these elements may serve as interaction elements that may be monitored by the computer-facilitated service.

When the user, through the user name input field 504 and the password input field 506, provides its set of account credentials, it may select the log in button 508 to provide the set of account credentials to the computer-facilitated service. The computer-facilitated service may determine whether this set of account credentials are legitimate and, if not, prevent further access to the missing information on the site 502. However, if the set of account credentials are legitimate, the computer-facilitated service may determine, based at least in part on a variety of previously recorded activity logs, whether this set of credentials have been used for suspicious activity. For instance, if the set of account credentials have been utilized an inordinate amount of times over a short time span, the computer-facilitated service may further suspect that these credentials are being utilized by an automated agent or other automated process. Such a suspicion may result in an increase in the number of interaction elements that are presented to the user or prevent any further access to the site 502. The interactions with the various fields and buttons illustrated in FIG. 5 may be recorded in an activity log and used to classify the user as either a legitimate customer or an automated agent, as described above.

Figure 6:
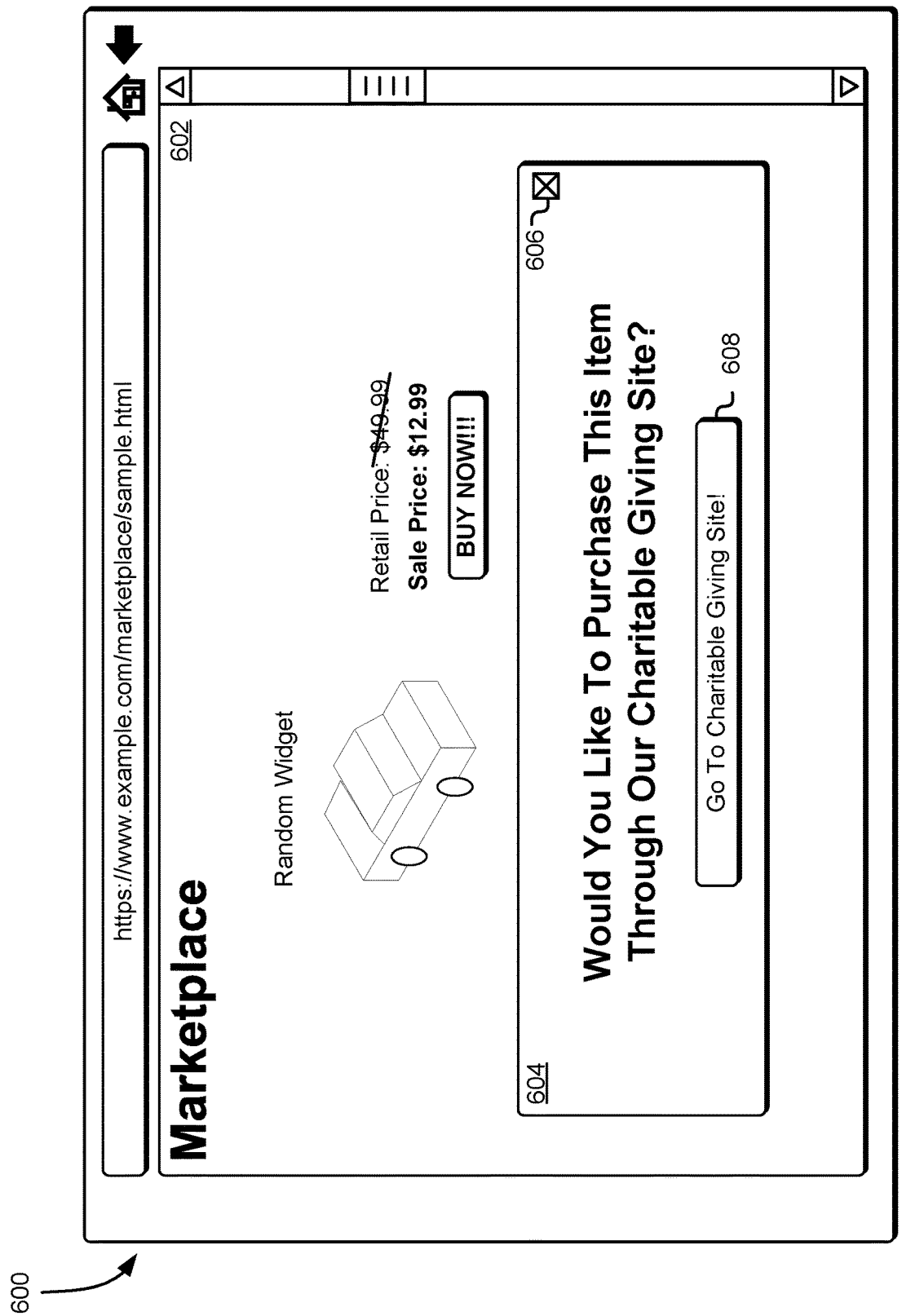
FIG. 6 shows an illustrative example of an environment in which interaction elements for accessing a charitable giving site are utilized to classify users in accordance with at least one embodiment.

FIG. 6 shows an illustrative example of an environment 600 in which interaction elements for accessing a charitable giving site are utilized to classify users in accordance with at least one embodiment. The charitable giving site interstitial interaction element 604 may be presented to the customer through a client interface in a manner that enables the user to obtain information from a portion of the underlying site 602, which the user has requested access to. In some embodiments, the computer-facilitated service may provide, through the client interface, the charitable giving site interstitial interaction element 604 in a manner that prevents the customer from interacting with any input fields or buttons included on the site 602. For instance, as illustrated in FIG. 6, the customer may be unable to utilize the "BUY NOW!!!" button on the site 602 until it has terminated the interstitial user interface interaction element 604 through use of the closure button 606. Thus, a user may need to finish interacting with the interstitial user interface interaction element 604 before the computer-facilitated service determines whether to enable the customer to access the input items on the site 602.

The charitable giving site interstitial interaction element 604 may present, to the user, an option to access an alternative site to obtain particular information normally presented on the site 602. For instance, through the interstitial user interface interaction element 604, the user may select the redirect button 608 to access a charitable giving site in which the user may interact with an alternative version of the site 602 originally requested. Through this alternative site, the computer-facilitated service may monitor the customer's activities to record interactions with the site 602 that can be used to classify the user as either a legitimate customer of the computer facilitated service or as an automated agent. The charitable giving site interstitial interaction element 604 may include a closure button 606, which the user may use to terminate the interstitial interaction element 604 and access the site 602. In some embodiments, the computer-facilitated service may redirect the customer to an alternative site, present the user with alternative interaction elements, or terminate the user's access to the site 602 if, based at least in part on interaction with the interstitial interaction element 604, the computer-facilitated service classifies the user as an automated agent or other automated process. For instance, if the user attempts to bypass the charitable giving site interstitial interaction element 604 by modifying the code of the component, the computer-facilitated service may record this interaction within an activity log. This activity log may be used as input to a user classification component, which may classify the user as an automated agent based at least in part on its interactions with the interstitial interaction element 604.

Figure 7:
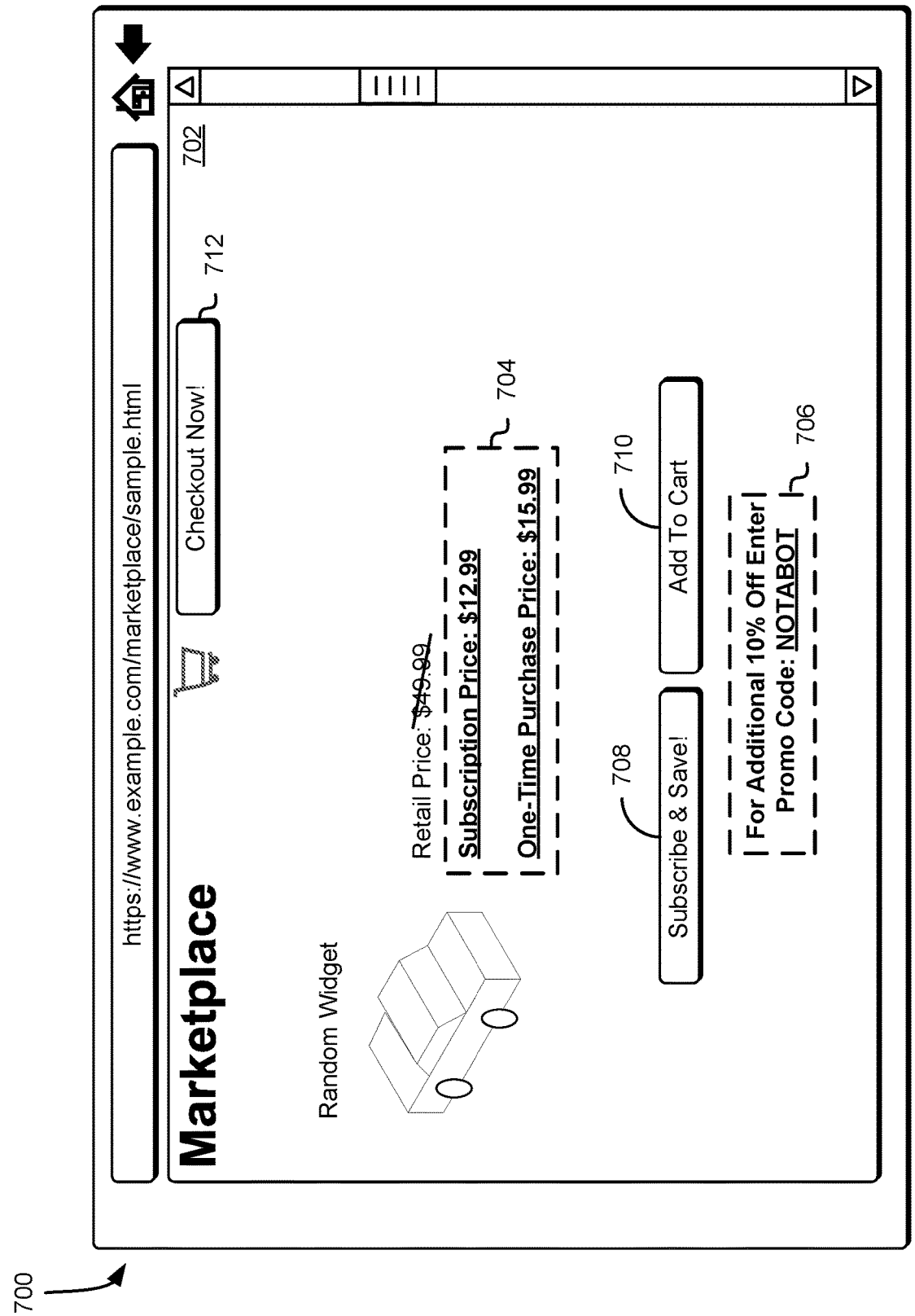
FIG. 7 shows an illustrative example of an environment in which interaction elements for subscribing to receive an item at certain time intervals are utilized to classify users in accordance with at least one embodiment.

In some embodiments, the computer-facilitated service generates one or more interaction elements that may entice legitimate customers to initiate a subscription to obtain an item at regular intervals. Further, the computer-facilitated service may generate one or more interaction elements that may provide legitimate customers with a discount code for use in requests to obtain the item, which may typically not be detected or used by automated agents or other automated processes. Accordingly, FIG. 7 shows an illustrative example of an environment 700 in which interaction elements for subscribing to receive an item at certain time intervals are utilized to classify users in accordance with at least one embodiment.

In this illustrative example, the computer-facilitated service may present a subscription price interaction element 704, which may be used to illustrate potential price differences between the retail price of an item offered by the computer-facilitated service and the price for the same item if the user opts to subscribe to a service to obtain the item at regular time intervals. The subscription price interaction element 704 may be presented in conjunction with a subscription user interface button 708, which a user may utilize to submit a request to obtain the item and sign up for a subscription for the item to take advantage of the more favorable price presented in the subscription price interaction element 704. The computer-facilitated service may monitor use of the subscription user interface button 708 and the add to cart button 710 to determine whether the user has opted to subscribe to obtain the item at regular time intervals or to obtain the item a single time without entering into a subscription with the service. This information may be recorded in the activity log in response to the user having selected the checkout now button 712 to submit the request. The user classification system may utilize the user's interactions with the subscription user interface button 708 to classify the user as either an automated agent or as a legitimate customer of the computer-facilitated service.

In addition to the subscription price interaction element 704 and the subscription user interface button 708, the computer-facilitated service may generate a promotional code interaction element 706 within the site to monitor user behavior on the site 702. If the user selects the checkout now button 712 to finalize its order to obtain the item, the user may be presented with an opportunity to enter the promotional code specified in the promotional code interaction element 706 to take advantage of the promotional code. In some embodiments, the computer-facilitated service monitors the promotional code interaction element 706 to determine if the user uses a cursor to highlight the promotional code specified in the promotional code interaction element 706 and uses the application to copy the promotional code for use in obtaining the item (e.g., enters a keyboard command to copy the code onto a digital clipboard, uses a mouse to introduce a drop-down menu for copying the code onto the digital clipboard, etc.). Further, the computer-facilitated service may monitor the site generated if the user selects the checkout now button 712 to determine if the user provides the promotional code. This information may also be added to the activity log, which the user classification system may use to classify the user as a legitimate customer or as an automated agent.

Figure 8:
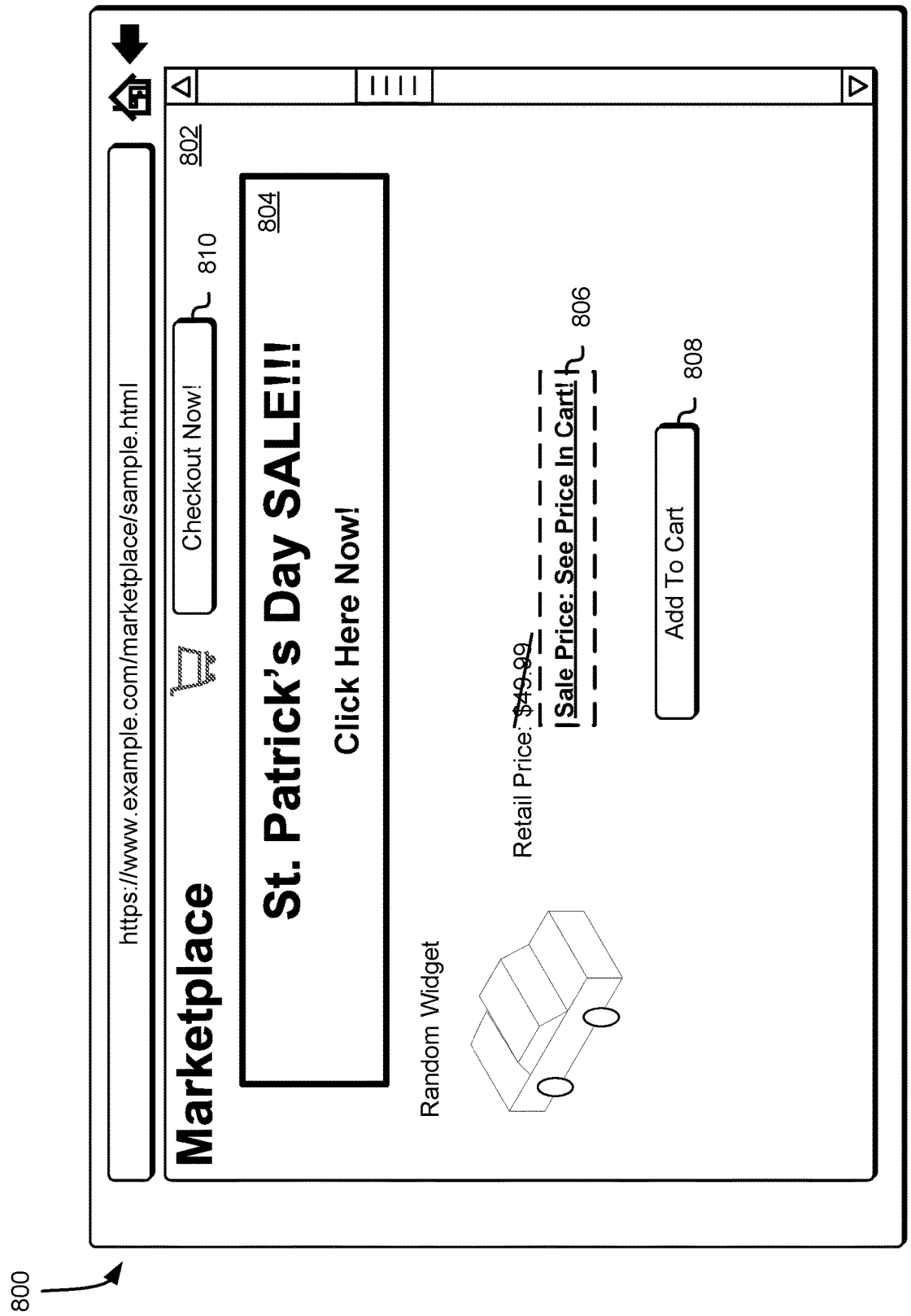
FIG. 8 shows an illustrative example of an environment in which interaction elements for accessing a sale for items offered by a computer-facilitated service and for indicating that details for an item are accessible via another webpage are utilized to classify users in accordance with at least one embodiment.

FIG. 8 shows an illustrative example of an environment 800 in which interaction elements for accessing a sale for items offered by a computer-facilitated service and for indicating that details for an item are accessible via another webpage are utilized to classify users in accordance with at least one embodiment. In this illustrative example, the computer-facilitated service may present a banner interaction element 804, which may be used to present an advertisement, sale, or other information that may be attractive to a user of the site 802. For example, as illustrated in the environment 800, the computer-facilitated service may present a banner interaction element 804 that is used to advertise a sale. The banner interaction element 804 may also be selected by a user to access another site to view any sale items made available by the computer-facilitated service.

The computer-facilitated service may monitor and record any interactions with the banner interaction element 804 in an activity log for the user. For instance, the computer-facilitated service may record the length of time that a user observes the banner interaction element 804 without scrolling down to view more information about the item presented on the site 802 or interacting with other elements on the site 802 for submitting a request to obtain the item. Further, the computer-facilitated service may record, in the activity log for the user, interactions with the banner interaction element 804 that result in the user accessing an alternative site provided by the computer-facilitated service. This behavior may be used by the user classification system to classify the user as either a legitimate customer of the computer-implemented service or an automated agent.

The computer-implemented service may also utilize a redirection interaction element 806 to instruct a user to perform one or more actions in order to obtain additional information from the site. For example, as illustrated in the environment 800, the computer-facilitated service may prompt the user, through the redirection interaction element 806, to use the add to cart button 808 followed by the checkout now button 810 to access another site of the computer-facilitated service and obtain the desired information. The computer-implemented service may monitor the user's interactions within the other site to determine whether the user submits its request to obtain the item, returns to the original site, or performs any other operations that may be influenced by the information presented on the other site. These actions by the user may be recorded in the activity log and used by the user classification system as input to one or more functions for classification of the user.

It should be noted that the interaction elements presented in FIGS. 4-8 are examples of interaction elements that can be presented to a user and monitored to provide information for classifying the user but are not an exhaustive representation of the interaction elements that may be presented. For instance, the computer-facilitated service may present a user with a search query field, which the user may utilize to submit one or more search terms. In an embodiment, the computer-facilitated service may provide, through the search query field, one or more search query suggestions based at least in part on characters provided as input in the search query field. For instance, as the user inputs characters into the search query field, the computer-facilitated service may update the one or more search query suggestions based at least in part on the characters specified in the search query field. The computer-facilitated service may record user interactions with the search query field and the provided suggestions, which may be used to classify the user. For example, the computer-facilitated service may determine that the user is likely an automated agent if the user does not interact with the provided suggestions after inputting a certain number of characters into the search query field. Techniques related to generating search query suggestions to users as users enter queries into a search query field are described in more detail in U.S. Pat. No. 6,564,213, which is hereby incorporated in its entirety by reference. In an alternative example, the computer-facilitated service may present, via the site, an interaction element that illustrates user reviews of the item presented on the site. The computer-facilitated service may monitor user interaction with the interaction element as the user reads the reviews. Thus, other interaction elements usable to influence user behavior and monitored by the computer-facilitated service are considered to be within the scope of this disclosure.

In some embodiments, the techniques described herein can also be applied to devices, systems, and services that perform natural language and/or speech-based interactions with users. For instance, a content server may present to a user an option to learn more about items that are for sale, whereby the user may speak into a device to indicate whether it would like to take advantage of the presented option. Based at least in part on the user's response, the computer-facilitated service, via a user classification system, may classify the user as either a human user or as an automated agent. In some instances, the user classification system may also utilize the user's speech patterns to determine whether these are indicative of a human user or of an automated agent. For instance, the content servers may present the user with content that is tailored to elicit a particular emotional response from the user. For example, the content servers may indicate that the user has been selected to enter into a drawing for a new car or to take advantage of promotional pricing for a desired product. Based at least in part on the user's inflection in its response to the indication, the user classification system may classify the user as either a human user or an automated agent. In other instances, the content servers may prompt the user to raise or lower its voice to obtain different inflection points for the user. This may also be used to classify the user. It should be noted that the use of such devices and techniques may be combined with any of the techniques described above in connection with FIGS. 4-8 and with those not requiring an auditory response. Other techniques related to devices, systems, and services that perform natural language and/or speech-based interactions with users are described in U.S. Patent Publication Nos. 2016/0042748 and 2015/0170665, which are hereby incorporated in their entirety by reference.

Figure 9:
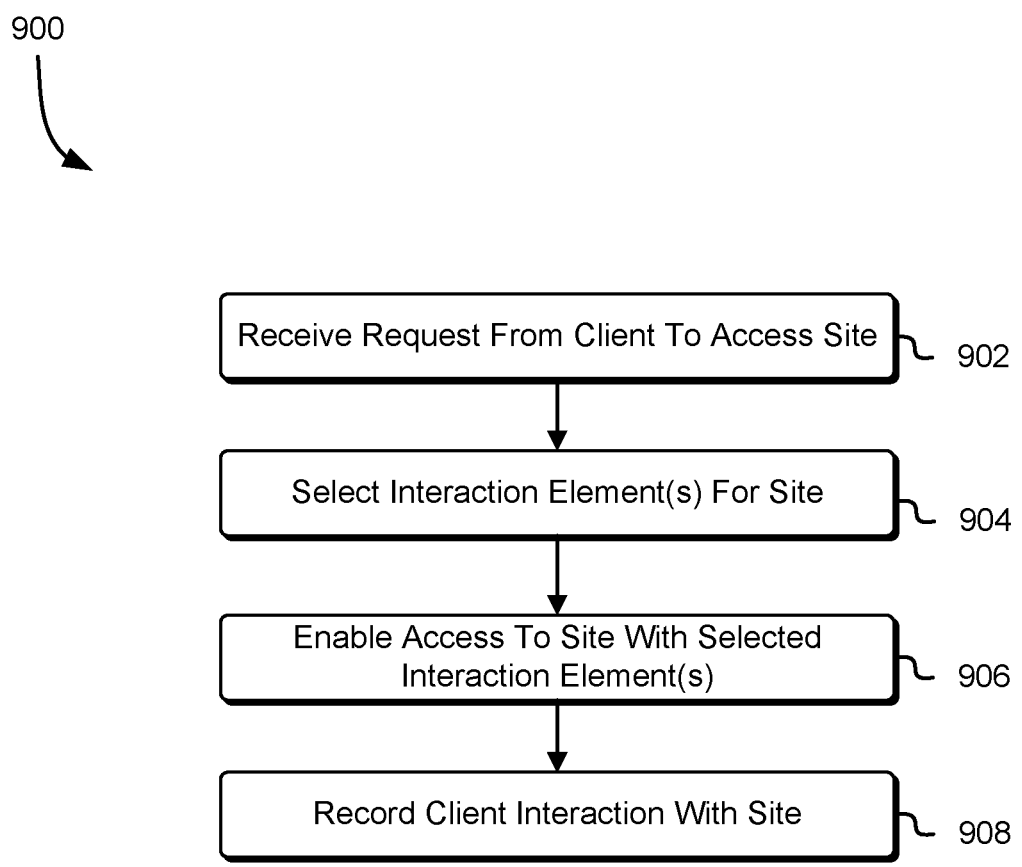
FIG. 9 shows an illustrative example of a process for presenting a site with one or more interaction elements usable to classify users and recording user interactions with the interaction elements in accordance with at least one embodiment.

As noted above, in response to a request from a user to access a site provided by a computer-facilitated service, the computer-facilitated service may select one or more interaction elements that may be presented to the user via the site. The computer-facilitated service may monitor any user interactions with these interaction elements, which may be recorded in an activity log for the user. This activity log may be used as input to one or more classification functions usable to classify the user as either a legitimate customer or as an automated agent. Accordingly, FIG. 9 shows an illustrative example of a process 900 for presenting a site with one or more interaction elements usable to classify users and recording user interactions with the interaction elements in accordance with at least one embodiment. The process 900 may be performed by one or more content servers of the computer-facilitated service, which may interact with an experimentation system to obtain code usable to generate interaction elements.

At any time, the computer-facilitated service, via the one or more content servers, may receive 902 a request from a client (e.g., user) to access a site provided by the computer-facilitated service. When the client submits the request to access the particular site, the one or more content servers may obtain information necessary to determine whether the client may be granted access to the site. For instance, the one or more content servers may determine, from the request, identifying information for the client. The identifying information may include a set of user credentials for the client, IP address for the client, one or more cookies, and the like. This identifying information may be used to determine the client's past activities as related to the particular site or other sites and resources provided by the computer-facilitated service.

In some embodiments, the one or more content servers access a customer profile datastore to determine whether there is an existing profile for the client. The profile of the client may specify the aforementioned past activity. Additionally, the profile may specify information used to classify the client as either a legitimate customer of the computer-facilitated service or as an automated agent. The classification of the client may have been performed previously in response to notifications from other services or entities, such as a bulletin from a security service indicating identities of automated agents used to perform malicious activities.

In response to the request, the one or more content servers may access the experimentation system to select 904 one or more interaction elements that may be presented on the site and used to monitor client behavior as the client interacts with these interaction elements. The experimentation system may select one or more interaction elements as a result of having a recorded probability of a human interacting with the one or more interaction elements that reaches a value relative to a threshold value. For example, a user classification system, as described above, may record user interactions with interaction elements and determine, based at least in part on these interactions, a probability that a human user will interact with or otherwise be influenced by the interaction element. The experimentation system may select interaction elements that have a recorded probability that a human interacts with, or is influenced by (e.g., cause the user to interact with other elements in response to presentation of the one or more interaction elements, etc.), the interaction element and that exceeds a threshold value. The one or more content servers may obtain the code usable to generate the selected interaction elements on the site. Further, the one or more content servers may access one or more other services associated with the computer-facilitated service to obtain data that may be presented via these interaction elements. For example, if the one or more content servers select a banner interaction element, such as the banner interaction element 804 presented in FIG. 8, the one or more content servers may access an advertisement service to obtain data usable to populate the banner interaction element with images and other details for an advertisement that may be presented via the banner interaction element.

In some embodiments, the one or more content servers may use the information garnered from the profile of the client, as well as other information specified in the request, to determine whether the client is a suspected automated agent. For instance, if the IP address of the client corresponds to an IP address range for known automated agents, the one or more content servers may identify the client as a potential automated agent. If the one or more content servers determine that the client is a suspected automated agent, the one or more content servers may access the experimentation system to select additional interaction elements to be presented via the site. These additional interaction elements may be used to obtain more behavior information for the client and increase the accuracy for classifying the client as either an automated agent or a legitimate customer of the computer-facilitated service. These additional interaction elements may also mitigate any attempts of an automated agent to obtain sensitive information from the site. Alternatively, if the one or more content servers determine that the client is a suspected automated agent, the content servers may select the alternative, fewer, or the same interaction elements that may be presented to a human user.

In response to selecting the interaction elements to be presented to the client, the one or more content servers may enable 906 the client to access the site with the selected interaction elements. The one or more content servers may monitor the client's interactions with the site and the one or more interaction elements. For instance, the one or more content servers may track any cursor movements, button presses, keyboard key presses, movement of the interaction elements through use of a scroll bar of the application used to present the site, time duration of inactivity at a particular portion of the site, and the like. Additionally, the one or more content servers may track any auditory responses provided by the client, which may be used to determine the inflection of the client, as well as other emotional responses to the interaction elements. The one or more content servers may record 908 these client interactions with the site and the one or more interaction elements in an activity log specific to the client. This activity log may be used as input to one or more functions usable to classify the client as either a legitimate customer of the computer-facilitated service or an automated agent.

Figure 10:
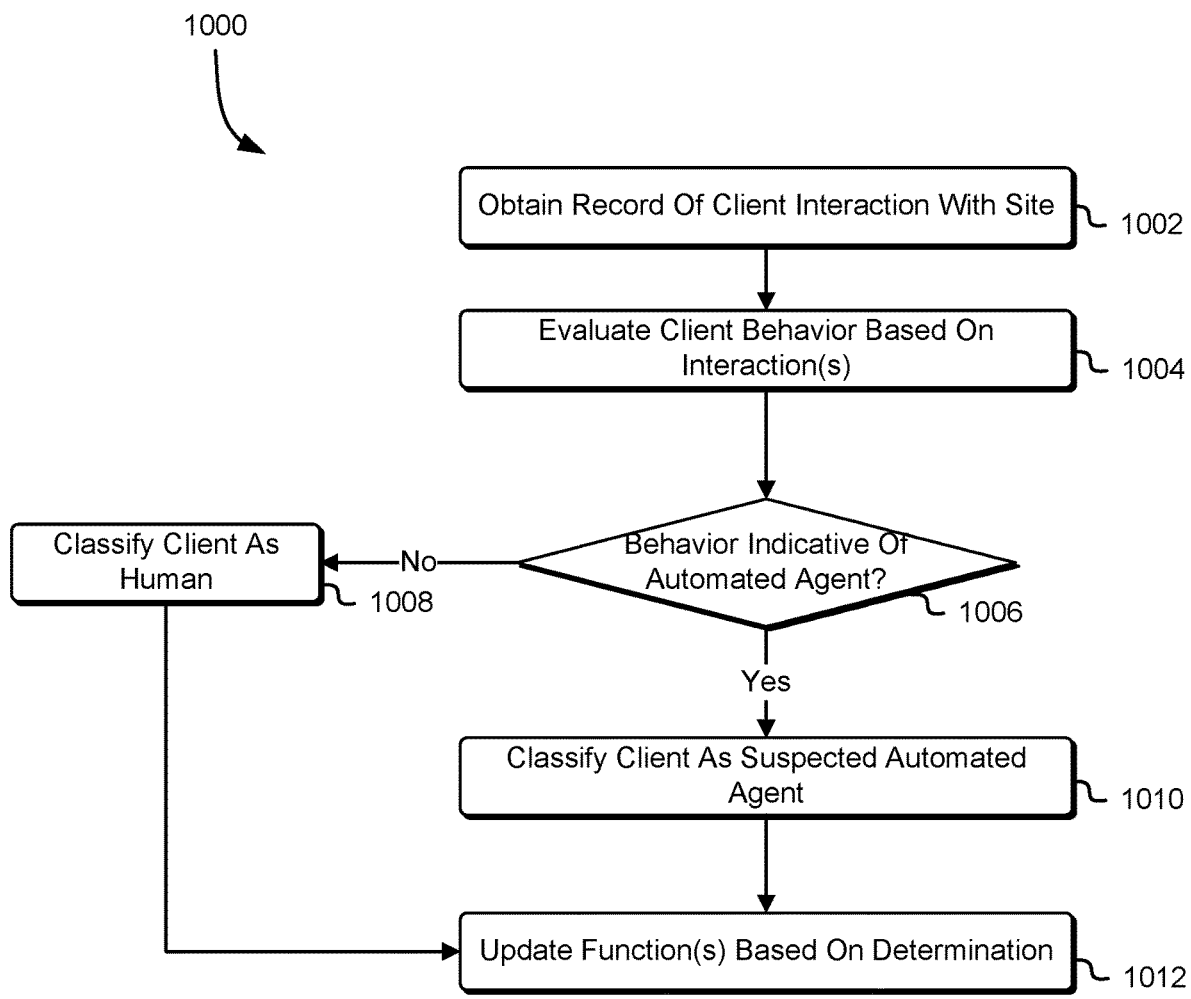
FIG. 10 shows an illustrative example of a process for using a record of user interactions with interaction elements of a site to classify the user as either a legitimate customer or an automated agent in accordance with at least one embodiment.

As noted above, the computer-facilitated service may include a user classification system, which may use the activity log of a client as input to one or more classification functions to classify the client as either a legitimate customer of the computer-facilitated service or an automated agent. In some instances, the user classification system may update the one or more functions based at least in part on the accuracy of the classification and on information garnered through use of machine learning algorithms described above. Accordingly, FIG. 10 shows an illustrative example of a process 1000 for using a record of user interactions with interaction elements of a site to classify the user as either a legitimate customer or an automated agent in accordance with at least one embodiment. The process 1000 may be performed by the aforementioned user classification system.

The user classification system may access an activity log repository to obtain 1002 a record of client interactions with a site provided by the computer-facilitated service. The record may be maintained in an activity log generated by the one or more content servers of the computer-facilitated service. The activity log may include one or more entries, each corresponding to interaction elements presented to the user. Each entry within the activity log may specify any cursor movements, button presses, keyboard key presses, movement of the corresponding interaction element through use of a scroll bar of the application used to present a site, time duration of inactivity at a particular portion of the site, and the like. Additionally, or alternatively, each entry may specify information regarding the influence of the interaction element in the user's behavior in interacting with the site. For instance, if the interaction element includes an interstitial user component element that obfuscates other elements of the site, the entry within the activity log may specify whether the user attempted to bypass or modify the code of the interstitial user component element to access the obfuscated elements of the site.

The user classification system may organize the entries specified in the activity log into one or more vectors, which may be analyzed, through the one or more classification functions to evaluate 1004 the client's behavior and determine 1006 whether the user is likely a legitimate customer of the computer-facilitated service or an automated agent. The results of these analyses, utilizing the one or more functions, may be used to classify the client. The user classification system may generate classification data based at least in part on the output of the one or more functions. This classification data may specify the determined classification of the client based at least in part on the analysis of the activity log. If the user classification system determines that the client is likely a legitimate customer of the computer-facilitated service, the user classification system may classify 1008 the client as a human or legitimate customer. Further, the user classification system may update 1012 the one or more functions based at least in part on the determination made through the one or more functions.

If the user classification system determines, based at least in part on the output of the one or more functions that the client is likely an automated agent, the user classification system may classify 1010 the client as a suspected automated agent. Further, in some embodiments, the user classification system identifies one or more interaction elements that are to be presented to the user if the user accesses the computer-facilitated service at a later time. For instance, the user classification system may interact with an experimentation system to identify potential interaction elements that may be used to garner additional behavior characteristics of the user, which may be used to further confirm the classification assigned to the user and to update 1012 the one or more functions used by the user classification system to classify users of the computer-facilitated service. The user classification system may transmit the classification data to a customer profile datastore where it may be stored in association with a customer profile for the client.

In some embodiments, if the user classification system determines that the client is likely an automated agent, the user classification system may cause the one or more content servers to present one or more challenges to the client. These one or more challenges, in some cases, may be tunable. For example, the challenge may be made more difficult as load on a system increases. Difficulty may vary in one or more aspects. For example, in some embodiments, difficulty is varied by varying the number of computations required, on average, to successfully complete the challenge. Other types of computing resource usage may also be varied in addition to or instead of varying the computational difficulty. For example, the amount of memory usage required to complete a challenge may be varied. Generally, any type of computing resource usage that may be varied may be used to vary the difficulty of the challenge. Other variations are also considered as being within the scope of the present disclosure.

In other embodiments, if the user classification system determines that the client is likely an automated agent, the user classification system may omit network traffic information associated with the client from a datastore for network traffic directed towards the webpage or the service itself. For instance, an administrator of the service may evaluate network traffic for the webpage or other resource provided to users to determine how users interact with the webpage or the other resource. This information may be used to update the functionality of the webpage or other resource. The user classification system may cause the service to discard any entries corresponding to network traffic generated by the client from this datastore such that the network traffic does not impact the administrator's analysis of the network traffic for the webpage or other resource. Such testing of user interactions with a webpage or other resource is described in U.S. Patent Application No. 2014/6611981, which is hereby incorporated in its entirety by reference.

Figure 11:
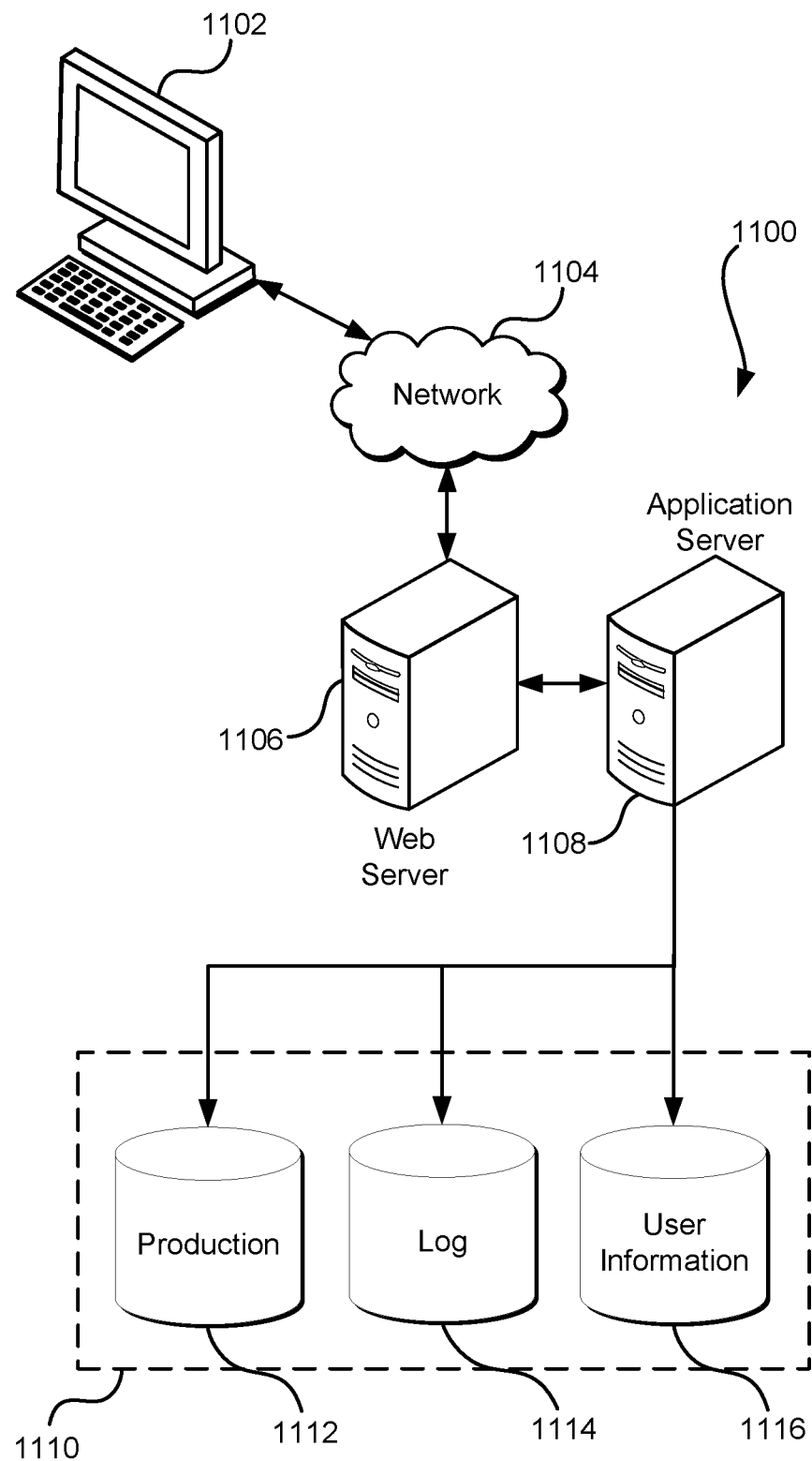
FIG. 11 shows an illustrative example of an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to access a webpage, having a first interaction element, provided by a computer-facilitated service, the request specifying one or more characteristics of a requestor;
   selecting, based at least in part on the one or more characteristics of the requestor, a second interaction element presentable through the webpage, while maintaining access to the first interaction element, where the second interaction element is selected as a result of having a recorded probability of a human interacting with the second interaction element that reaches a value relative to a threshold value;
   rendering the webpage to include the first interaction element and the second interaction element, the webpage allowing interaction with both the first interaction element and the second interaction element;
   recording information specifying interactions with the second interaction element and operations performed as a result of presentation of the second interaction element;
   applying a model to the information to classify the requestor from a plurality of classifications that comprises human users and automated agents; and
   removing network traffic associated with the requestor from a repository of network traffic for analyzing use of the webpage as a result of the requestor being classified as an automated agent.

2. The computer-implemented method of claim 1, wherein:
the second interaction element is an interstitial user interface component usable to access another webpage; and
the method further comprises recording information specifying interactions with the other webpage, the information specifying the interactions with the other webpage usable with the model to classify the requestor.

3. The computer-implemented method of claim 1, wherein:
the second interaction element includes search query suggestions presented via a search query field of the webpage; and
the interactions with the second interaction element include selection of a search query suggestion in response to providing input into the search query field.

4. The computer-implemented method of claim 1, wherein:
the second interaction element specifies a limitation on a number of items obtainable through the website; and
the interactions with the second interaction element include a quantity of items requested by the requestor through the webpage.

5. A system, comprising at least one computing device configured to implement one or more services, wherein the one or more services:
select an interaction element presentable through a user interface of a client device, where the interaction element is selected to prevent blocking of other elements presented through the user interface, the interaction element further selected as a result of having a recorded probability of a human user interacting with the interaction element that reaches a value relative to a threshold value;
cause the user interface to present the interaction element;
record information involving interaction with the interaction element;
apply a model to the information to determine a classification of a requestor that submitted the request from a plurality of classifications that comprises human users and automated agents; and
record an association between the requestor and the classification.

6. The system of claim 5, wherein:
the interaction element specifies a limitation on a quantity of an item obtainable through requests made via the user interface; and
the information involving interaction with the interaction element includes data corresponding to a second quantity of the item requested by the requestor via the user interface.

7. The system of claim 5, wherein the one or more services further:
select another interaction element that, as a result of being presented via the user interface, obfuscates other information presented via the user interface;
record second information involving interaction with the other interaction element, where the second information includes data corresponding to attempts to circumvent the other interaction element to access the other information; and
apply the model to the second information to refine the classification of the requestor.

8. The system of claim 5, wherein the one or more services further present, based at least in part on the association and in response to a request from the requestor to access the user interface, additional interaction elements via the user interface.

9. The system of claim 5, wherein the information involving interaction with the interaction element includes: user interface cursor movements, user interface button presses, keyboard key presses, periods of inactivity interacting with the user interface, and modification of programming code of the interaction element presented via the user interface.

10. The system of claim 5, wherein:
the interaction element specifies a user interface banner that includes a hyperlink to access a website via the user interface; and
the information involving interaction with the interaction element includes data corresponding to use of the hyperlink to access the website and interactions with the website via the user interface.

11. The system of claim 5, wherein:
the interaction element specifies instructions for obtaining other information associated with an item presented via the user interface; and
the information involving interaction with the interaction element includes data corresponding to actions undertaken by the requestor in pursuance of the instructions specified in the interaction element.

12. The system of claim 5, wherein:
the interaction element specifies a coupon code presentable via the user interface to obtain an item at a reduced rate; and
the information involving interaction with the interaction element data corresponding to presentation of the coupon code by the requestor via an input field of the user interface.

13. A non-transitory computer-readable storage medium having stored thereon executable instructions that, as a result of being executed by one or more processors of a computer system, cause the computer system to at least:
select an interaction element presentable through a user interface, where the interaction element is selected as a result of having a recorded probability of a human interacting with the interaction element that reaches a value relative to a threshold value, the interaction element presentable with a plurality of elements of a webpage, the webpage allowing interaction with the interaction element and the plurality of elements;
use a model to determine, based at least in part on information recorded based at least in part on presentation of the interaction element via the user interface, a classification of a requestor that submitted a request, the classification from a plurality of classifications that comprises human users and automated agents; and
record an association between the classification and the requestor.

14. The non-transitory computer-readable storage medium of claim 13, wherein the instructions further cause the computer system to select the interaction element based at least in part on characteristics of the requestor, the characteristics of the requestor specified in the request.

15. The non-transitory computer-readable storage medium of claim 13, wherein the instructions further cause the computer system to present, based at least in part on the association and in response to a second request from the requestor to access the user interface, fewer interaction elements via the user interface.

16. The non-transitory computer-readable storage medium of claim 13, wherein the information recorded based at least in part on the presentation of the interaction element includes data corresponding to actions undertaken by the requestor in response to instructions specified in the interaction element.

17. The non-transitory computer-readable storage medium of claim 13, wherein the information recorded based at least in part on the presentation of the interaction element includes data corresponding to use of a hyperlink presented via the interaction element to access a website and interactions within the website.

18. The non-transitory computer-readable storage medium of claim 13, wherein the information recorded based at least in part on the presentation of the interaction element includes data corresponding to attempts to circumvent the interaction element to access other information obfuscated by the interaction element.

19. The non-transitory computer-readable storage medium of claim 13, wherein the information recorded based at least in part on the presentation of the interaction element includes data corresponding to a quantity of an item requested by the requestor via the user interface in response to a limitation presented via the interaction element on the quantity of the item obtainable through requests made via the user interface.

20. The non-transitory computer-readable storage medium of claim 13, wherein the information recorded based at least in part on presentation of the interaction element via the user interface includes digitally encoded audio signals generated in response to the interaction element and inflections detectable within the digitally encoded audio signals.

* * * * *